United States Patent Office 3,317,579
Patented May 2, 1967

3,317,579
PROCESS FOR PURIFYING METHYLENEBIS (4-PHENYLISOCYANATE)
Mark Herbert Rosen, Claymont, and William Kenneth Witsiepe, Wilmington, Del., assignors to E. I. du Pont de Nemours and Company, Wilmington, Del., a corporation of Delaware
No Drawing. Filed Apr. 16, 1965, Ser. No. 448,851
5 Claims. (Cl. 260—453)

This invention relates to a new process for lowering the acidity of methylenebis(4-phenylisocyanate) produced by phosgenation of 4,4'-methylenedianiline.

Commercial preparation of organic isocyanates is normally accomplished by phosgenation of the corresponding amine. The crude products prepared by phosgenation contain chlorine-containing impurities which are acidic in nature and are only partially removed by fractional distillation. The exact nature of all of these acidic impurities is not known for certain, but it is known that they liberate hydrogen chloride in the presence of compounds having active hydrogens. The analysis for acidity (ASTM D-1638-60T) is based on potentiometric titration of the acidic components released upon reacting an isocyanate with excess n-propanol. Methanolic potassium hydroxide is used as the titrant.

While these acidic impurities do not always interfere with the use of isocyanates, their presence in some applications is objectionable. The impurities may reduce the effectiveness of basic catalysts that are often employed in isocyanate reactions. In addition, these impurities appear to be involved in the formation of color in stored isocyanates and in reaction products prepared from such isocyanates.

In the case of methylenebis(4-phenylisocyanate), the problems presented by chlorine-containing impurities which contribute to acidity are often especially troublesome. Because of the high boiling point of this diisocyanate, it is not practical to purify it by fractional distillation. Further, methylenebis(4-phenylisocyanate) is used in the preparation of a variety of polymeric materials where high purity is essential for uniform physical properties and reproducible aging behavior.

In order to control the acidity of organic isocyanates heating in the absence of added agents prior to distillation is known. Likewise, heating in the presence of a Friedel-Crafts catalyst is disclosed in U.S. Pat. No. 3,155,-699; of iron, copper, or zinc in U.S. patent application Ser. No. 291,306 to Irwin, filed June 28, 1963; of water in French Pat. No. 1,356,147. While these agents do in fact put the acidic impurities in a form from which the isocyanate can be relatively easily isolated, the use of these agents with methylenebis(4-phenylisocyanate) is attended by serious yield losses and/or operating difficulties. Simple heating is of only limited use in reducing acidity and is also accompanied by serious yield losses.

It is an object of the present invention to provide a process for reducing the acidity of methylenebis(4-phenylisocyanate), which process obviates the difficulties encountered when the prior art purification methods are applied to this isocyanate. Another object is to provide such a process which obtains a greater reduction in acidity in a given period of time than prior art methods which use metals or Friedel-Crafts catalysts. Other objects will appear hereinafter.

These and other objects of the present invention are accomplished by contacting methylenebis(4-phenylisocyanate) with iron oxide ($Fe_2O_3$) at a temperature of about 180–240° C. to obtain a reaction mixture from which the desired isocyanate having a lower content of acidic impurities can readily be recovered, such as by distillation.

As might be expected in the case of a reaction involving a liquid and a solid, the efficiency of the treatment appears to depend on the surface area of the oxide employed and on uniform contacting of the isocyanate with the oxide. For this reason, it is usually desirable to use finely divided iron oxide. An exception to this preference is when the operation is conducted continuously with packed towers filled with pellets or beads of compacted or sintered iron oxide. Catalysts such as ferric chloride can not be used in this convenient manner because of their solubility in the isocyanate.

Temperatures ranging from about 180° C. to 240° C. are useful in the present process. Below about 180° C., purification does not proceed with sufficient rapidity to be practical. Above about 240° C., decomposition of the methylenebis(4-phenylisocyanate) may proceed with such rapidity as to cause excessive loss of valuable material. The temperature range of 195° C. to 225° C. is preferred.

The time required to significantly reduce the acidity of impure methylenebis(4-phenylisocyanate) may vary from about a minute up to a few hours, depending on the state of division, quantity and type of iron oxide, the effectiveness of contact of isocyanate with the oxide and temperature. In the preferred temperature range, nearly complete removal of acidity can be accomplished in 20 minutes or less under practical conditions.

The process of the present invention may be operated at any pressure as long as the boiling point of the isocyanate is not exceeded under the conditions used. This problem only arises at pressures less than atmospheric. Vacuum operation may be convenient on occasion because a useful way of carrying out the process of the present invention consists of introducing contaminated isocyanate and oxide into the pot of a batch vacuum still and refluxing the isocyanate, which furnishes agitation, under vacuum until purification has proceeded to the desired point. The purified isocyanate may be obtained by distillation directly away from the oxide and other non-volatile impurities, including non-volatile acidic contaminants.

The amount of oxide which is theoretically required so that distillation will effect removal of acidity contributing compounds from a sample of methylenebis(4-phenylisocyanate) is not known for certain. In actual practice, the oxide of iron is employed in what appears to be considerable excess because unreacted oxide usually is present after the purification. In batch purifications, about 0.02 to 1% by weight of iron oxide based on the weight of the isocyanate may be used. Even larger amounts of oxide can be used and may be advantageous from the standpoint of shortening the time of reaction. In many situations it may be possible to reuse the oxide until it is consumed to such a point as to be nearly exhausted. When the purification is performed in continuous equipment, the oxide is usually present in tremendous excess at any given time but can be used until it is essentially exhausted. In actual practice, new oxide should be added periodically to continuous equipment to maintain efficiency at a level found to be acceptable by experience.

As has already been indicated, a variety of types of equipment can be used for carrying out the purification. These include continuous equipment such as packed towers or vessels containing beads or granules of iron oxide and batch equipment where agitation may be furnished mechanically or by boiling. The convenient process modification of using a vacuum still pot as a purification vessel has already been discussed.

Following treatment of impure isocyanate with an oxide of iron, the desired isocyanate may be distilled directly away from high-boiling impurities and unused oxide or it may first be filtered to remove the oxide and then distilled. Results are comparable by either of these procedures. In continuous operation, the oxide normally is retained more or less completely in the treating equipment so that filtration automatically precedes distillation.

Distillation of methylenebis(4-phenylisocyanate) is carried out at reduced pressures so that the isocyanate is not exposed to excessively high temperatures as would be the case with fractional distillation. In general, temperatures above 240° C., the suggested upper limit for the purification, should not be exceeded during distillation. It is preferred to use even lower temperatures for distillation if possible to obtain refined isocyanate of maximum purity and stability. Molecular stills may be used to advantage to avoid high temperatures during distillation of methylenebis(4 - phenylisocyanate). Molecular distillation has the additional advantage of yielding isocyanate having slightly lower acidity than that resulting from conventional vacuum distillation. It appears that traces of hydrogen chloride which are present in the isocyanate after contact with iron oxide are removed more completely by molecular distillation. While vacuum distillation is effective in avoiding the condensation of HCl with the desired isocyanate, this type of distillation is usually made more effective by employing a warm condenser for the isocyanate so as to minimize the solubility of HCl in the condensate.

The present process may be applied to crude diisocyanate containing phosgenation tars or to distilled material which is free of tar. When the process is applied to crude isocyanate, it may be advantageous to remove any loosely bound hydrogen chloride or phosgene from the isocyanate by heating and/or sparging with an inert gas prior to introducing iron oxide.

A most important advantage of the present process is the small loss of valuable isocyanate caused by the oxide treatment. This loss amounts to only about 1–2% by weight of the total diisocyanate present before the treatment. This compared favorably to losses on the order of 5% or higher resulting from the reduction of acidity by heating alone or by heating with added metallic iron for example. In other words, iron oxide minimizes decomposition of the desired isocyanate while effecting a lowering of its acidity.

The reduction in acidity is determined according to "Tentative Methods of Testing Urethane Foam Raw Materials," ASTM designation D1638–60T. While this testing method was originally written for tolylene diisocyanate, it has been found to be applicable to many other isocyanates, including methylenebis(4-phenylisocyanate).

It should be noted that the hydrolyzable chlorine content of methylenebis(4-phenylisocyanate) is also effectively reduced by the present process. This is not surprising since the analysis for hydrolyzable chlorine represents another method of determining chlorine-containing impurities in isocyanates. Apparently many of the impurities which are present are included in the values obtained by both analytical procedures.

The following examples are illustrative of specific embodiments of the present invention and are therefore not to be construed as a limitation on the scope thereof. Parts and percents are by weight unless otherwise noted.

*Example 1*

About 250 g. of crude methylenebis(4-phenylisocyanate), prepared by phosgenating 4,4'-methylenedianiline essentially by the procedures of U. S. Pat. No. 2,822,373, is placed in 500 ml. round bottom flask under a nitrogen atmosphere and equipped with an agitator. The diisocyanate is heated to 200° C. and 0.25 g. of reagent grade ferric oxide is added. The mixture is agitated and its temperature is maintained at 200° C. Samples of about 50 g. are withdrawn from the flask 20, 40 and 60 minutes after the ferric oxide addition. Each of these samples is distilled at a pressure of about 1 mm. Hg and a pot temperature of about 180° C. The three distillates are analyzed for acidity by ASTM D1638–60T with following results:

| Reaction time, min.: | Acidity, percent |
|---|---|
| 20 | 0.0025 |
| 40 | .0002 |
| 60 | .0002 |

The acidity of the crude isocyanate is initially about 0.04%. When the crude isocyanate is heated as above, but in the absence of ferric oxide, and subsequently distilled, the acidity is about 0.03%.

When 250 g. of crude isocyanate prepared as described above is heated for an hour at 200° C. in the presence of 0.52 g. of ferric chloride and then distilled, the acidity of the recovered isocyanate is reduced to 0.0103%. Heating of the same quantity of another sample of the same crude isocyanate for 1 hour at 200° C. with 1 g. of iron powder in place of ferric chloride and distilling reduces the acidity to 0.0021%.

*Example 2*

The procedure of Example 1 is repeated using 2.5 g. of reagent grade ferric oxide with the following results:

| Reaction time, min.: | Acidity, percent |
|---|---|
| 20 | 0.0024 |
| 40 | Nil |
| 60 | 0.0005 |

*Example 3*

The procedure of Example 1 is repeated using 0.25 g. of iron oxide scraped from the surface of low carbon steel which had been exposed to the weather for 2 months. The following results were obtained.

| Reaction time, min.: | Acidity, percent |
|---|---|
| 20 | 0.0091 |
| 40 | .0031 |
| 60 | .0025 |

*Example 4*

The procedure of Example 1 is repeated using 0.25 g. of commercial ferric oxide at a reaction temperature of 225° C. The following results are obtained.

| Reaction time, min.: | Acidity, percent |
|---|---|
| 20 | 0.0015 |
| 40 | 0.0012 |
| 60 | 0.0012 |

When the crude isocyanate used in this example is distilled prior to treating, the distillate has an acidity of 0.0311%.

*Example 5*

Crude methylenebis(4-phenylisocyanate), prepared as in Example 1, is pumped at a measured rate through a heater and into the bottom of a heated glass vessel filled with cylindrical pellets of ferric oxide, ¼" in diameter and ¼" long. The temperature in the vessel is controlled at 200° C. The reaction mass flows through a side nozzle in the vessel after passing through the bed of pellets. Samples of about 50 g. are taken after 1, 20, 24, and 44 hours of operation. All of the material processed between the 51st and 59th hours of operation is collected in a single container, thoroughly mixed and then sampled. Each of the five samples obtained is distilled at 1 mm. Hg and 180° C. and analyzed with the following results:

| Hours of Operation | Contact Time, Min.[1] | Acidity Percent |
|---|---|---|
| 1 | 18 | 0.0044 |
| 20 | 18 | 0.0025 |
| 24 | 23 | 0.0028 |
| 44 | 23 | 0.0041 |
| 51–59 | 23 | 0.0034 |

[1] Ratio of the volume of free space in the vessel to the volume of isocyanate fed per minute.

When the isocyanate treated as above is molecularly distilled at a pressure of 1-2 microns of Hg and an evaporator surface temperature of about 130–140° C., the acidity is about 0.001%.

As many widely different embodiments of this invention may be made without departing from the scope thereof, it is to be understood that this invention is not limited to the specific embodiments thereof except as defined in the appended claims.

What is claimed is:

1. A process for removing impurities that cause acidity in methylenebis(4-phenylisocyanate) comprising contacting said isocyanate with ferric oxide at a temperature between about 180° C. and 240° C. and thereafter recovering said isocyanate from the resultant reaction mixture.

2. The process as recited in claim 1 wherein said temperature is between 195 to 225° C.

3. The process as recited in claim 1 wherein at least 0.02% by weight of ferric oxide is present.

4. The process as recited in claim 1 wherein sufficient ferric oxide is present to react with substantially all of said impurities.

5. A process for treating methylenebis(4-phenylisocyanate) so that acidic impurities can be readily removed therefrom by distillation, comprising contacting said isocyanate with ferric oxide at a temperature between about 180° C. and 240° C.

References Cited by the Examiner

UNITED STATES PATENTS 3,155,699  11/1964  Powers _____ 260—453

CHARLES B. PARKER, *Primary Examiner.*

RICHARD L. RAYMOND, D. H. TORRENCE,
*Assistant Examiners.*